Patented Apr. 4, 1950

2,502,576

UNITED STATES PATENT OFFICE 2,502,576

PRODUCTION OF POLYAMIDES CONTAINING GLUTARIMIDE RINGS

James Lincoln and James Gordon Napier Drewitt, London, England, assignors to Celanese Corporation of America, a corporation of Delaware No Drawing. Application March 6, 1946, Serial No. 652,483. In Great Britain March 15, 1945

2 Claims. (Cl. 260—78)

This invention relates to the production of polyamides from polyamines and polycarboxylic acids, and more particularly to the production of polyamides from diamines and polycarboxylic acids containing more than two carboxyl groups.

We have found that certain tri- and tetra-carboxylic acids, when condensed with di-primary-amines, are capable of yielding infusible insoluble resins or intermediates which are readily convertible into such resins and of yielding linear polymers which, if of sufficiently high molecular weight, are film- or fibre-forming, these two types of product being obtained by varying the conditions of condensation.

The tricarboxylic acids are of the type such that two of their carboxyl groups are separated by three atoms and the third carboxyl group is separated from either of the other carboxyl groups by a number of atoms other than two. The tetracarboxylic acids are of the type in which two carboxyl groups are separated by three atoms, the remaining two carboxyl groups are separated by two or three atoms, and when two carboxyl groups, however selected, are separated by two atoms then the remaining two carboxyl groups are separated by three atoms. These carboxylic acids, on simple condensation of the free acids or their amide-forming derivatives with a di-primary-amine, yield infusible insoluble resins or water-soluble intermediates which can be converted into such resins, while if the condensation is carried out in presence of a substance containing a formyl radicle they yield linear polymers which, if the condensation be carried sufficiently far, are capable of being formed into films or filaments. This latter form of the invention is preferably effected by using at least part of the di-primary-amine in the form of a formyl derivative or of a formate.

In the preferred form of the invention, the atoms separating the carboxyl groups are carbon atoms. Examples of such acids in the tricarboxylic series are 1.3.5-pentane-tricarboxylic acid, 1.3.6-hexane-tricarboxylic acid, 1.3.7-heptane-tricarboxylic acid, and 1.1.3-propane-tricarboxylic acid. Examples of tetracarboxylic acids are 1.2.4.6-hexane-tetracarboxylic acid, methane tetracetic acid $C(CH_2COOH)_4$ and carboxy-methane triacetic acid $COOH.C.(CH_2COOH)_3$. Most of the above acids are of the type in which a pair of carboxyl groups is separated by three atoms, the other carboxyl group of a tri-acid and each of the other carboxyl groups of a tetra-acid, which are themselves separated by two or three atoms, being separated from each of the carboxyl groups of the first-mentioned pair by a number of atoms other than two.

In making infusible insoluble resins, the diamine and the tri- or tetra-carboxylic acid may be used in substantially equimolecular proportions or in any other desired proportions. When the acid is used in excess there is obtained a polymer with free carboxyl groups, and when the amine is used in more than an equivalent amount a polymer with free $NH_2$ groups is obtained. Other polymer-forming materials, e. g. a polyester-forming mixture, can be incorporated, if desired, with the mixture of diamine and tri- or tetra-carboxylic acid before condensation.

The more valuable products according to the present invention are, however, produced by condensing the tri- or tetra-carboxylic acid with a substantially equimolecular amount of the di-primary-diamine, the latter being employed at least in part as the formyl derivative or as the formate. Under these conditions the products of the invention are linear and, if of sufficiently high molecular weight, are fibre-forming materials, which can be used as such or in admixture with other thermoplastic materials. The condensation under the fibre-forming conditions can be effected with other linear polyamide-forming reagents present as copolymerants in the polymerisation mixture.

The formation of the insoluble infusible type of resin is almost certainly due to cross-linking, whereas the production of the linear thermoplastic polymers in accordance with the invention is very probably due to the formation of imide rings as opposed to cross-linking. Thus by condensing substantially equimoles of 1.3.5-pentane-tricarboxylic acid with hexamethylene diamine, using the latter, at least in part, as the formyl derivative or as the formate, a linear polymer is probably formed as follows:

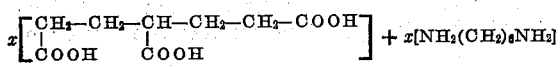 + $x[NH_2(CH_2)_6NH_2]$ → 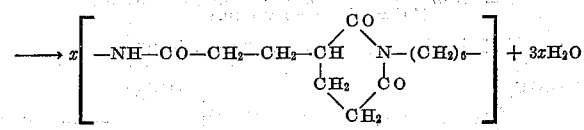 + $3xH_2O$

Similarly a tetracarboxylic acid such as methane tetracetic acid yields a polymer which probably contains glutarimide linkages, and 1.2.4.6-hexane-tetracarboxylic acid, a polymer which contains alternate succinimide and glutarimide linkages.

Those tri- and tetra-carboxylic acids of the invention which contain two carboxyl groups attached to the same carbon atom tend to eliminate carbon dioxide on heating with substantially an equimolecular amount of diamine and consequently, where it is desirous to avoid this elimination, the acid should be employed as the ester. Thus, for example, when 1.3.3.5-pentane-tetracarboxylic acid is condensed with an equimolecular amount of diamine, carbon dioxide is eliminated and the product obtained is substantially identical with that resulting from polymerisation of 1.3.5-pentane-tricarboxylic acid and diamine under similar conditions. If, however, this tetracarboxylic acid is employed as the ester, carbon dioxide is not eliminated and a different product is obtained.

The tri- or tetra-carboxylic acids to be used in accordance with the invention may be obtained in many cases from malonic ester as starting material. Thus, when malonic ester is reacted with two moles of acrylonitrile or acrylic ester, there can readily be obtained from the resulting condensation product 1.3.3.5-pentane-tetracarboxylic acid or ester or 1.3.5-pentane tricarboxylic acid or ester as desired. Thus the tetracarboxylic ester is produced directly from the malonic ester and the acrylic ester, the tetracarboxylic acid from the malonic ester and either the acrylonitrile or the acrylic ester, followed by alkaline saponification, the tricarboxylic acid by acid saponification of the same reaction mixture or by decarboxylation of the tetracarboxylic acid and the tricarboxylic ester by esterification of the tricarboxylic acid. Similarly malonic ester, when condensed with one mole of acrylonitrile will give CN.CH2CH2CH(COOC2H5)2, which can be readily converted to 1.1.3-propane-tricarboxylic ester. The same tricarboxylic ester can be produced directly by condensation of malonic ester with one mole of acrylic ester. In some cases the preparation may be effected by first reacting the mono-sodium derivative of malonic ester with a halonitrile or halo-ester or a dihalide, and then reacting the resulting product with a β-unsaturated nitrile or ester, followed if necessary by hydrolysis and removal of one or more of the carboxyl groups. The method outlined above can be illustrated by the following series of equations for the preparation of (a) 1.3.6-hexane-tricarboxylic acid

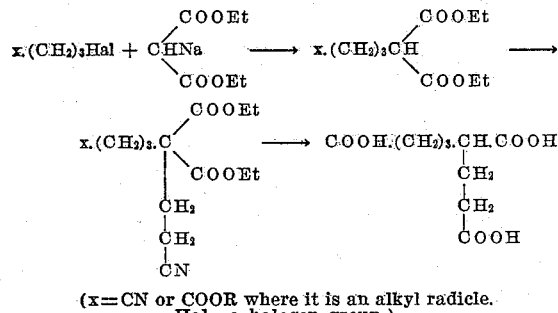

(x = CN or COOR where it is an alkyl radicle. Hal = a halogen group.)

and (b) 1.3.6.8-octane-tetracarboxylic acid

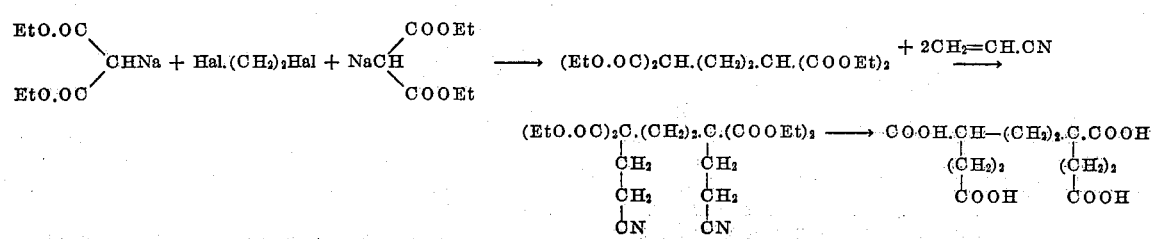

Examples of diprimary amines other than hexamethylene diamine which can be employed are tetramethylene diamine, octamethylene diamine, 1.4-diaminocyclohexane, γ-γ'-diaminodipropyl ether and β-β'-diamino-diethyl sulphide.

The condensation of the diprimary diamine with the tri- or tetra-carboxylic acid, or the amide-forming derivative thereof, is effected by heating together substantially equimolecular amounts of the acid and the diamine at a suitable temperature, e. g. 150–300° C., until the product has the desired properties. Thus, for example, if the product desired is a water-soluble resin which can be heat-hardened to an infusible, insoluble product, then the initial polymerisation will of necessity be quite mild, e. g. about twenty minutes at 150–200° C. On the other hand, if a linear fibre-forming product is desired, the reactant, including some N.N'-diformyl diamine or some formic acid, will be polymerised together until the product can be formed into continuous filaments.

The polymerisation may be carried out in the absence of a solvent, in the presence of a solvent, e. g. phenol, cresol, or xylenol, or in the presence of a non-solvent diluent.

Instead of the polycarboxylic acid itself, amide-forming derivatives thereof, for example the acid chloride or the anhydride, may be employed, and, as mentioned above, it is preferable in some cases to use the ester of the acid.

The polymerisation can be effected in the presence of other linear polymer-forming reactants. Thus, other linear polyamide-forming reactants, for example suitable monoaminocarboxylic acids, such as ε-amino caproic acid, and equimolecular mixtures of dibasic acids and diamines, preferably diprimary diamines, can be added to the polymerisation mixture in any desired proportion. Examples of suitable dibasic acids are adipic, suberic and sebacic, and examples of suitable diamines are those listed above. Similarly, when making the heat-hardening resins, other polymer-forming reactants can be present if desired. Thus, for example, a polyhydric alcohol such as glycerol or glycol may be present with appropriate adjustment of the proportion of acid, so that the final product is a valuable modified glyptal resin.

When making the linear or fibre-forming polymers it is frequently desirable to adopt special means to prevent the polymerisation going beyond a certain degree, that is to say to limit the possible average molecular weight of the polymer obtained, and at the same time to render the polymer viscosity-stable so that it does not alter appreciably in viscosity when heated, for example for the purposes of spinning. This can in general be achieved by using a small excess, for example .2–5% (molar), of either the diamine or the polycarboxylic acid, or by introducing into the reaction mixture a small amount, for example .2–5 molar percent of a mono-amine or monocarboxylic acid or amide-forming derivative of the latter. The smaller the excess of either reagent or the smaller the amount of the mono-amine or monocarboxylic acid, the larger will be the average molecular weight of the polymer.

The invention will now be illustrated by the following examples, in which all parts are by weight:

Example 1

A mixture of 10 parts of 1.3.5-pentane tricarboxylic acid and 8.4 parts of N.N'-diformyl hexamethylene diamine was heated at 255° C. for 2 hours in an inert atmosphere, followed by 1 hour at 255° C. under reduced pressure. The product was a pale yellow transparent polymer, melting about 130–150° C. Continuous filaments could readily be drawn from the melt, and the product was soluble in formic acid and $m$-cresol, having an intrinsic viscosity of 0.41 in the latter.

Example 2

A mixture of 11.8 parts of 1.3.5-pentane tricarboxylic acid and 6.7 parts of hexamethylene diamine was heated in an inert atmosphere for 2 hours at 190–195° C. The product was a pale yellow insoluble, infusible resin.

Example 3

A mixture of 11.8 parts of 1.3.5-pentane tricarboxylic acid and 6.7 parts of hexamethylene diamine was heated in an inert atmosphere at 190–195° C. for 20 minutes. The product, a light-yellow transparent resin, was water-soluble and was useful for the preparation of transparent films which were rendered infusible and insoluble by simple heat treatment.

Example 4

A mixture of 10 parts of 1.3.5-pentane tricarboxylic acid, 8.4 parts of N.N'-diformyl hexamethylene diamine, and 40 parts of hexamethylene diammonium adipate was heated for 2 hours at 255° C., followed by 45 minutes at 255° C. under reduced pressure and 20 minutes at 277° C. under reduced pressure. The product was a tough horny solid melting about 225–230° C., and having an intrinsic viscosity of 1.02 as measured in $m$-cresol. From the melt continuous filaments capable of being cold drawn could be readily obtained.

Example 5

A mixture of 10 parts of 1.3.3.5-pentane tetracarboxylic acid, 7 parts of N.N-'diformyl hexamethylene diamine and 40 parts of hexamethylene diammonium adipate was heated at 255° C. for 2 hours followed by 45 minutes at 255° C. under reduced pressure. During the initial heating carbon dioxide was evolved in an amount corresponding substantially with the elimination of one mole of $CO_2$ per mole of tetracarboxylic acid. The polymer so obtained was a milky greyish-white solid, melting about 230° C. It was soluble in formic acid and $m$-cresol, having an intrinsic viscosity of 0.60 in the latter. From the molten polymer fibres which could be cold drawn were readily obtained.

Example 6

A mixture of 10 parts of 1.3.5-pentane tricarboxylic acid, 5.7 parts of hexamethylene diamine, .2 part of formic acid, and 10 parts of hexamethylene diammonium adipate was heated for 2 hours at 255° C., followed by 1 hour at 255° C. under reduced pressure. The polymer, a milky greyish-white solid, melting about 150–180° C., had an intrinsic viscosity in $m$-cresol of 0.75. Fibres capable of being cold drawn were readily obtained from the molten polymer.

The resinous products of the invention, that is those which are prepared in the absence of any formic acid or formyl amine, are very useful materials for the formation of films, coating materials and moulded articles. They can be admixed with drying oils, plasticisers and other resinous materials, some of which, as mentioned above, can be formed during the production of the polyamide resins.

The other products of the invention, namely the fibre-forming polymers, are valuable materials for the production of filaments and films, and the production of these articles from the polymers prepared in the manner described above is included in the invention. In forming filaments, the choice of the method of spinning depends in part on the properties of the polymers. Where solutions in organic solvents can readily be produced, dry spinning methods may be employed with solutions in volatile solvents, and wet spinning methods with solutions in volatile or even comparatively non-volatile solvents. The polymers can be spun by melt spinning methods, i. e. by extruding a melt of the polymer through suitable orifices. In general, the temperature of the polymer to be extruded should be some 10–30° above the melting point of the polymer. This melting temperature may be modified to some extent by mixing the polymer with suitable proportions of plasticisers, for example sulphonamide plasticisers, phenolic plasticisers, urea and thiourea plasticisers and the like. Such plasticisers may either be left in the products or may be partially or completely extracted therefrom. A further method of spinning consists in forming a mixture of the polymer with a suitable liquid such as a phenol, the mixture being liquid at comparatively low temperatures such as 100–160° C. but solid at still lower temperatures, and spinning the mixture at a suitable temperature at which it is liquid, cooling the filaments to solidify them and removing the phenol or other substance. A 40% or 50% solution in phenol may, for example, be used and the phenol extracted from the filaments by means of water or benzene, or though less advantageously, the phenol may be evaporated.

The filaments so formed may be drawn out at comparatively low temperatures, or even at atmospheric temperature, to very fine filaments having high tenacity and good elasticity. The resulting filaments may then be used for any of the purposes to which artificial silks have in the past been applied.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, aceto-butyrate, butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like.

Having described our invention, what we desire to secure by Letters Patent is:

1. Process for the production of linear polyamides which comprises condensing in substantially equimolecular proportions the di-formyl derivative of a di-primary diamine, in which the formyl-amino groups are the sole reactive groups, with 1.3.5-pentane-tricarboxylic acid until a linear fiber-forming polymer is obtained.

2. Process for the production of linear polyamides which comprises condensing in substantially equimolecular proportions the di-formyl derivative of hexamethylene diamine, in which the formyl-amino groups are the sole reactive groups, with 1.3.5-pentane-tricarboxylic acid until a linear fiber-forming polymer is obtained.

JAMES LINCOLN.
JAMES GORDON NAPIER DREWITT.

REFERENCES CITED

The following references are of record in the file of this patent:

UNITED STATES PATENTS

| Number | Name | Date |
|---|---|---|
| 2,421,024 | Frosch | May 27, 1947 |

FOREIGN PATENTS

| Number | Country | Date |
|---|---|---|
| 570,858 | Great Britain | July 25, 1945 |

OTHER REFERENCES

H. Hopff et al., S. N. 389,002, published Apr. 20, 1943, by Alien Property Custodian.

Certificate of Correction

Patent No. 2,502,576 April 4, 1950

JAMES LINCOLN ET AL.

It is hereby certified that error appears in the printed specification of the above numbered patent requiring correction as follows:

Column 3, line 63, for the words "where it is" read *where R is;* and that the said Letters Patent should be read with this correction therein that the same may conform to the record of the case in the Patent Office.

Signed and sealed this 15th day of August, A. D. 1950.

[SEAL]

THOMAS F. MURPHY,
*Assistant Commissioner of Patents.*